United States Patent
Czuczman et al.

(10) Patent No.: US 9,679,554 B1
(45) Date of Patent: Jun. 13, 2017

(54) TEXT-TO-SPEECH CORPUS DEVELOPMENT SYSTEM

(71) Applicant: Amazon Technologies, Inc., Reno, NV (US)

(72) Inventors: Michal Czuczman, Rumia (PL); Michal Grzegorz Kurpanik, Bytów (PL); Remus Razvan Mois, Sopot (PL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 389 days.

(21) Appl. No.: 14/311,711

(22) Filed: Jun. 23, 2014

(51) Int. Cl.
*G06F 17/27* (2006.01)
*G10L 13/08* (2013.01)
*G06F 17/28* (2006.01)

(52) U.S. Cl.
CPC .............. *G10L 13/08* (2013.01); *G06F 17/27* (2013.01); *G06F 17/28* (2013.01)

(58) Field of Classification Search
CPC ......... G10L 13/08; G10L 13/00; G10L 13/10; G10L 13/027; G10L 13/07; G10L 15/187; G10L 15/063; G10L 15/06; G10L 2015/0631; G10L 13/06; G10L 13/02; G10L 19/0018

USPC ..... 704/1–10, 251, 255, 257, 258, 260, 261, 704/266, 243–245
See application file for complete search history.

(56) References Cited

U.S. PATENT DOCUMENTS

| | | | | |
|---|---|---|---|---|
| 5,829,000 A | * | 10/1998 | Huang | G10L 15/22 704/240 |
| 2011/0313757 A1 | * | 12/2011 | Hoover | G06F 17/2705 704/9 |
| 2013/0179170 A1 | * | 7/2013 | Cath | G10L 13/08 704/260 |
| 2013/0246048 A1 | * | 9/2013 | Nagase | G06F 17/2223 704/9 |

* cited by examiner

*Primary Examiner* — Huyen Vo
(74) *Attorney, Agent, or Firm* — Pierce Atwood LLP

(57) ABSTRACT

A system may determine text for inclusion in a voice corpus for use in text-to-speech (TTS) processing using an interface that allows multiple entities to connect and review potential text segments concurrently. The interface may allow networked communication with the system. Individual text segments may be approved or rejected by reviewing entities, such as proofreaders. The system may prioritize text segments to send to reviewers and may re-prioritize text segments based on a linguistic coverage of previously accepted text segments.

14 Claims, 8 Drawing Sheets

TEXT-TO-SPEECH CORPUS DEVELOPMENT SYSTEM

BACKGROUND

Human-computer interactions have progressed to the point where computing devices can render spoken language output to users based on textual sources available to the devices. In such text-to-speech (TTS) systems, a device converts text into an acoustic waveform that is recognizable as speech corresponding to the input text. TTS systems may provide spoken output to users in a number of applications, enabling a user to receive information from a device without necessarily having to rely on tradition visual output devices, such as a monitor or screen. A TTS process may be referred to as speech synthesis or speech generation.

Speech synthesis may be used by computers, hand-held devices, telephone computer systems, kiosks, automobiles, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

A text-to-speech (TTS) system using unit selection will generate higher quality output speech if the voice corpus it uses is sufficiently large and robust. The voice corpus, which includes audio segments that are grouped together to form words, includes samples of many different sounds, or phonetic units, that make up speech. Creating a voice corpus can be a time intensive task involving identifying various textual sources, determining which parts of the text should be used, proofreading the text to ensure text quality, recording an individual speaking the text, and dividing and storing the spoken audio files so that they are usable at a later time. Identifying and selecting text for a voice corpus (text that is eventually read) can be particularly time consuming, involving multiple back and forth exchanges with proofreaders, who confirm the validity of text before speech corresponding to the text is recorded.

Figure 1:
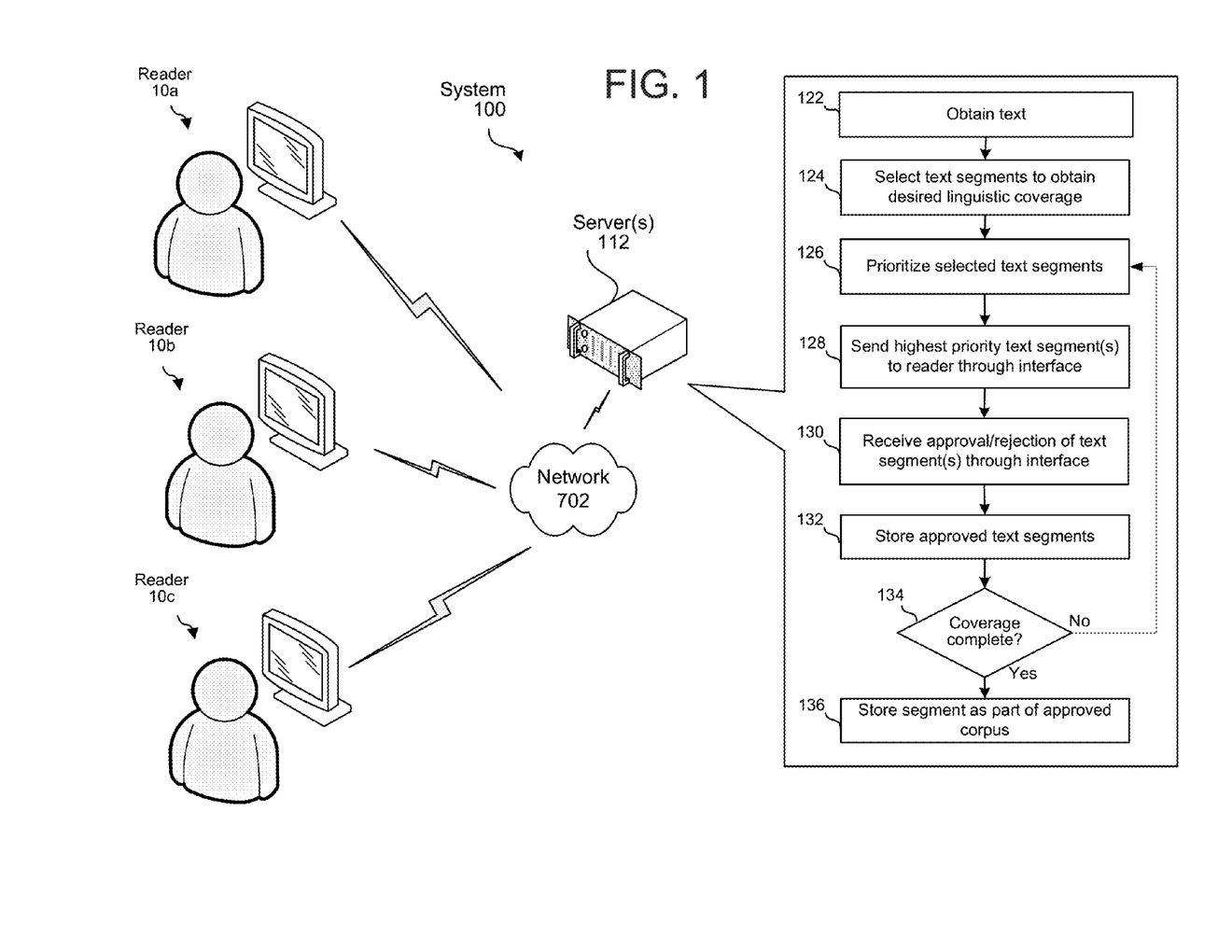
FIG. 1 illustrates a system for determining text for a voice corpus according to one aspect of the present disclosure.

To improve on existing systems of text gathering for a voice corpus, the following method and system is offered and described in reference to FIG. 1. FIG. 1 shows a system 100 that may be used to generate text for a voice corpus. First the system 100 may obtain text (122) from which segments may be selected for the voice corpus. The text may be taken from a number of different sources such as books, articles, news reports, plays, or other content. The system 100 may then pre-process the text, including performing linguistic analysis, prosody generation, text-normalization, etc. (and/or other techniques, as described below). After the text is pre-processed, the system 100 may select (124) certain segments of the text (for example which sentences, paragraphs, etc.) which include the phonetic units that the system 100 may desire to include in the eventual voice corpus. For example, if the system 100 is creating a voice corpus for use in synthesizing English text into speech, the system 100 may determine that it needs a certain number of text samples that when spoken will provide several examples of each English diphone. This text selection may be performed using various techniques, such as a set cover algorithm (described further below), which compares the desired phonetic units (e.g., diphones) of the corpus to the available linguistic scope of the text segments and will select a certain number of text segments (for example, several hundred or thousand sentences) that, when spoken, will provide sufficient audio samples for the voice corpus. The linguistic scope/coverage of a text segment may include the number of sounds covered by the phonetic units in the text segment (i.e., the text segment's phonetic coverage/scope). The linguistic scope may also include linguistic features such as the part of speech of the text segment and/or individual phonetic unit(s), such as whether a particular phonetic unit is part of a noun or verb, the tense of the verb, what intonation tones are used with the phonetic unit, what the phonetic unit's phase boundaries, syllable boundaries, the position of the phonetic unit within a word/phrase/sentence, the place or type of articulation of the phonetic unit, whether the phonetic unit includes a consonant sound, a vowel sound (and whether the vowel sound is long, short, etc.), whether the phonetic unit is part of content word or function word, or a variety of other considerations, which may also apply to the text segment in addition to the phonetic unit(s). As the purpose of the voice corpus is to create a library of sounds from which natural speech may be synthesized, the linguistic scope may be used to determine how many possible naturally sounding combinations may be synthesized using the analyzed segment in question, thus giving the system a metric through which the usefulness of a phonetic unit/text segment/corpus may be measured.

Once text segments are elected, the system 100 may prioritize the text segments (126) according to some metric so that they may be reviewed for correction/confirmation in order of priority. For example, text segments may be ordered based on their phonetic content, where text segments that include a wide variety of phonetic units (i.e., a wide linguistic scope) may be prioritized over those that include a lesser linguistic scope. Those text segments may then be sent (128), in order of priority, to proofreaders or other editors (for example readers 10a, 10b, and 10c). The segments may be presented to the proofreaders through a web interface between the server 112 and the reader computers connected over network 702. Text segments may be sent individually or in groups. The web interface may allow the proofreaders to review individual text segments one-by-one and indicate whether a particular text segment is a proper text segments for inclusion in the voice corpus, or has an error or other anomaly that makes it unsuitable for inclusion in the corpus.

The system 100 may receive (130), for example through the web interface, feedback on the text segments, i.e., indications from one or more proofreaders 10 that particular text segments have been approved or rejected. The system 100 may track and store (132) approved text segments for inclusion in the voice corpus. At certain intervals (for example, after receiving feedback for a group of text segments, after receiving feedback for each text segment, or some other intervals) the system 100 may compare (134) the linguistic coverage of the approved text segments to the desired linguistic coverage for the voice corpus. If the coverage is not yet complete, the system 100 may re-prioritize the remaining text segments that have not yet been reviewed by the proofreaders, and may continue sending text segments to the proofreaders and receiving feedback on those text segments. The process may continue until the approved text segments have reached the desired linguistic coverage for the voice corpus. The system 100 may then store (136) the corpus text. The corpus text may then eventually be indicated for recording and sent to the appropriate entities for recording, for example using a native speaker of the desired language, as well as taking other steps to construct the voice corpus.

The completed voice corpus may then be used for TTS processing by the system 100 or by other systems that may receive the voice corpus. TTS processing is typically a multi-step process beginning with the input of text and concluding with the output of audio corresponding to the text. For purposes of illustration, described below is a high level overview of a TTS process. The techniques described here for creating a voice corpus may be implemented as part of a TTS system as described below.

Text received by a TTS system may be received by a front-end for processing. The front-end may include modules for performing text normalization, linguistic analysis, and linguistic prosody generation. During text normalization, the front-end processes the text input and generates standard text, converting such things as numbers, abbreviations (such as Apt., St., etc.), symbols ($, %, etc.) into the equivalent of written out words.

During linguistic analysis the front end analyzes the language in the normalized text to generate a sequence of phonetic units corresponding to the input text. This process may be referred to as phonetic transcription. Phonetic units include symbolic representations of sound units to be eventually combined and output as speech. Various sound units may be used for dividing text for purposes of speech synthesis. A TTS system may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary. The linguistic analysis performed may also identify different grammatical components such as prefixes, suffixes, phrases, punctuation, syntactic boundaries, or the like. Such grammatical components may be used by the TTS system to craft a natural sounding audio waveform output. The language dictionary may also include letter-to-sound rules and other tools that may be used to pronounce previously unidentified words or letter combinations that may be encountered by the TTS system. Generally, the more information included in the language dictionary, the higher quality the speech output.

Based on the linguistic analysis the front end may then perform linguistic prosody generation where the phonetic units are annotated with desired prosodic characteristics, also called acoustic features, which indicate how the desired phonetic units are to be pronounced in the eventual output speech. During this stage the front end may consider and incorporate any prosodic annotations that accompanied the text input to the TTS system. Such acoustic features may include pitch, energy, duration, tone, and the like. Application of acoustic features may be based on prosodic models available to the TTS system. Such prosodic models indicate how specific phonetic units are to be pronounced in certain circumstances. A prosodic model may consider, for example, linguistic features such as a phoneme's position in a syllable, a syllable's position in a word, a word's position in a sentence or phrase, neighboring phonetic units, the phoneme's part of speech, etc. As with the language dictionary, prosodic model with more information may result in higher quality speech output than prosodic models with less information.

The output of the system, referred to as a symbolic linguistic representation, may include a sequence of phonetic units annotated with prosodic characteristics. This symbolic linguistic representation may be sent to a speech synthesis engine, also known as a synthesizer, for conversion into an audio waveform of speech for eventual output.

Actual speech synthesis may be performed in a number of ways. In one way, called parametric synthesis, various speech parameters may be used to create audio using a machine voice synthesizer, called a vocoder. Another technique called unit selection, is more processor/memory/computing-resource intensive, however it produces more natural sounding speech. During unit selection, a TTS system matches a database of recorded speech (called a voice corpus) against the symbolic linguistic representation of incoming text, such as a symbolic linguistic representation created by a front end, discussed above.

The voice corpus may include many hours of recorded speech (in the form of audio waveforms, feature vectors, or other formats), which may occupy a significant amount of storage. The recorded speech is typically divided into small segments called unit samples or units. The unit samples may be classified in a variety of ways including by phonetic unit (phoneme, diphone, triphone, word, etc.), linguistic prosodic label, acoustic feature sequence, speaker identity, etc. Each unit includes an audio waveform corresponding with a phonetic unit, such as a short audio segment of the specific sound, along with a description of the various acoustic features associated with the .wav file (such as its pitch, energy, etc.), as well as other information, such as where the phonetic unit appears in a word, sentence, or phrase, the neighboring phonetic units, etc. The voice corpus may include multiple examples of phonetic units to provide the TTS system with many different options for concatenating units into speech. Generally the larger the voice corpus, the better the speech synthesis may be achieved by virtue of the greater number of unit samples that may be selected to form the precise desired speech output.

Using all the information in the voice corpus, a TTS system may match units of the voice corpus to the symbolic linguistic representation of input text (including both phonetic units and prosodic annotations). Matching units are selected and concatenated together to create a natural sounding waveform for the speech output. An example of how unit selection is performed is illustrated in FIGS. 2A and 2B.

Figure 2A:
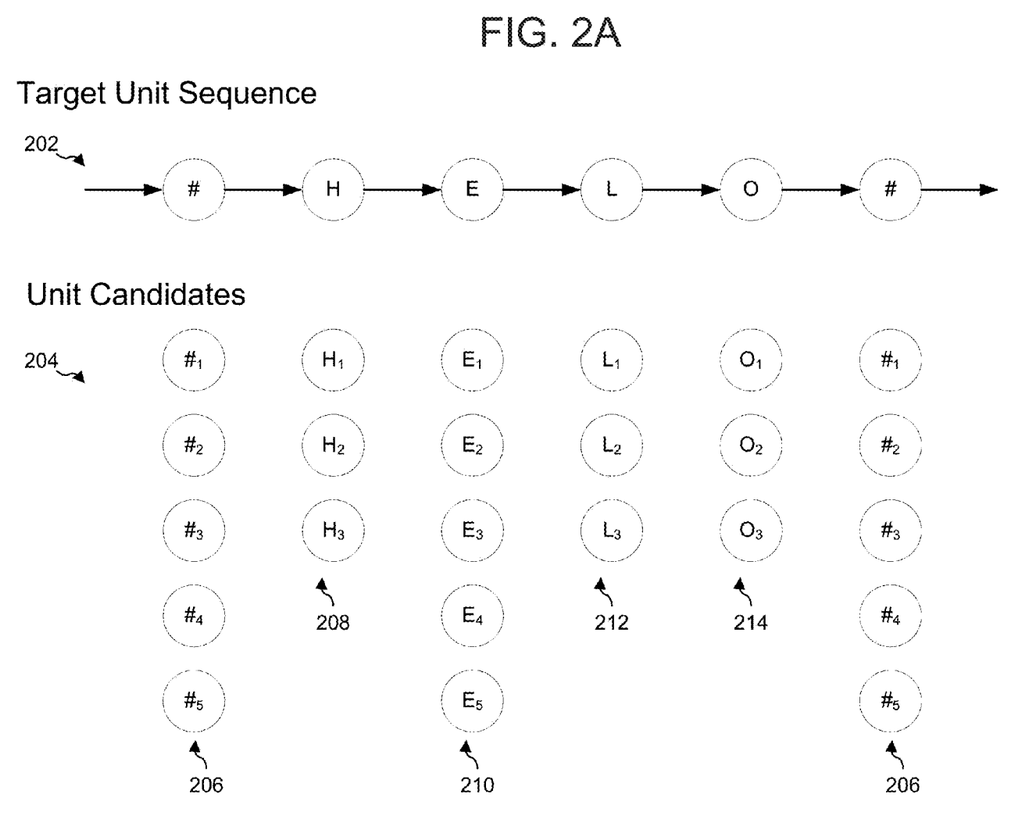
FIGS. 2A-2B illustrate speech synthesis using unit selection according to one aspect of the present disclosure.
Figure 2B:
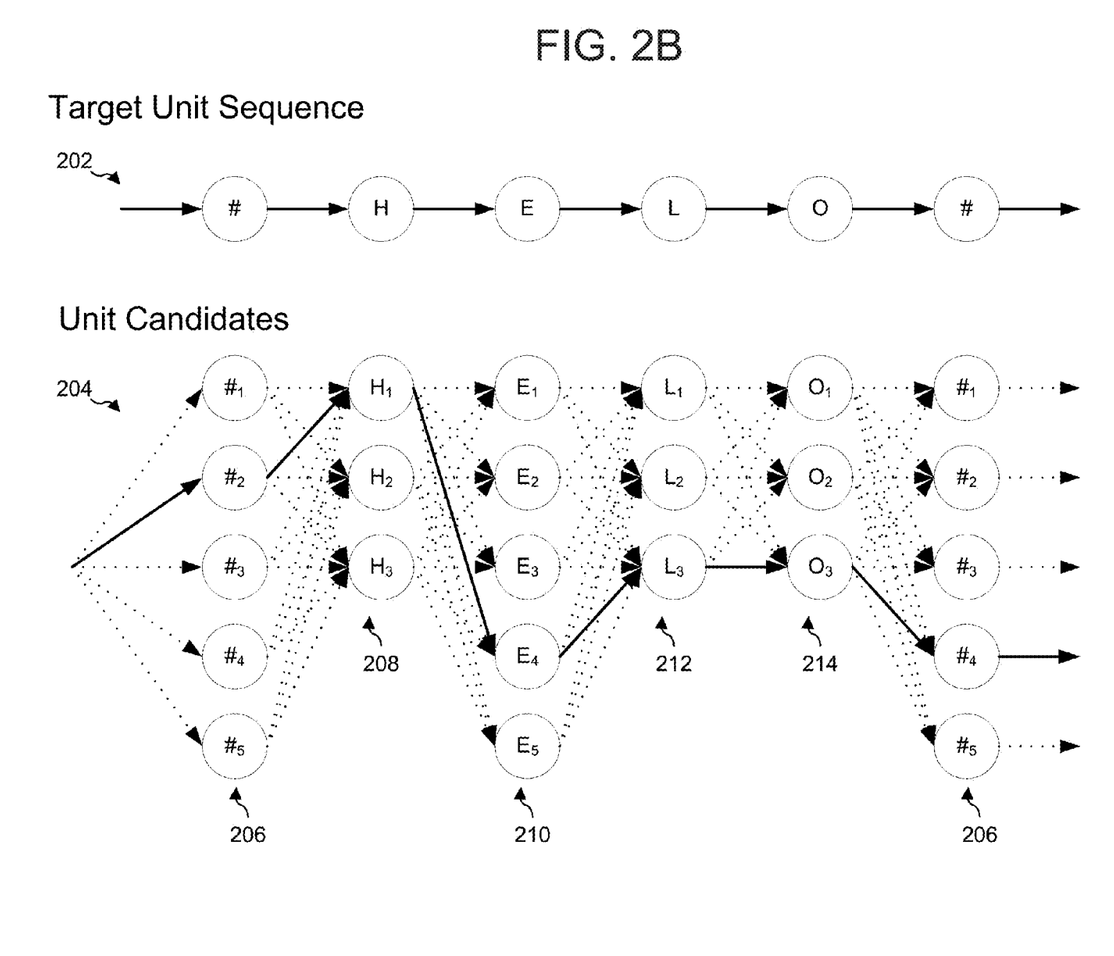

For example, as shown in FIG. 2A, a target sequence of phonetic units 202 to synthesize the word "hello" is determined by a TTS device. A number of candidate units 404 may be stored in the voice corpus. Although phonemes are illustrated in FIG. 2A, other phonetic units, such as diphones, may be selected and used for unit selection speech synthesis. For each phonetic unit there are a number of potential candidate units (represented by columns 206, 208, 210, 212 and 214) available. Each candidate unit represents a particular recording of the phonetic unit with a particular associated set of acoustic and linguistic features. The TTS system then creates a graph of potential sequences of candidate units to synthesize the available speech. The size of this graph may be variable based on certain device settings. An example of this graph is shown in FIG. 2B. A number of potential paths through the graph are illustrated by the different dotted lines connecting the candidate units. A Viterbi algorithm may be used to determine potential paths through the graph. Each path may be given a score incorporating both how well the candidate units match the target units (with a high score representing a low target cost of the candidate units) and how well the candidate units concatenate together in an eventual synthesized sequence (with a high score representing a low join cost of those respective candidate units). The TTS system may select the sequence that has the lowest overall cost (represented by a combination of target costs and join costs) or may choose a sequence based on customized functions for target cost, join cost or other factors. The candidate units along the selected path through the graph may then be combined together to form an output audio waveform representing the speech of the input text. For example, in FIG. 2B the selected path is represented by the solid line. Thus units $\#_2$, $H_1$, $E_4$, $L_3$, $O_3$, and $\#_4$ may be selected, and their respective audio concatenated, to synthesize audio for the word "hello."

A well-formed voice corpus is an important component to a robust and highly functional unit selection TTS system. Constructing a voice corpus, however, can be a difficult and time consuming task. In particular, obtaining text that will be eventually read for the voice corpus, and ensuring that the text is a good representation of the language to be recorded (i.e., is free of errors, etc.) is particularly labor intensive. Currently, a large volume of text is obtained from multiple sources like books, articles, internet sources, etc. to form a basis for potential speech to be included in the corpus. That large amount of text (which can include millions of sentences) is then processed to obtain a phonetic/phonological transcription of the text. An algorithm, such as a greedy set cover algorithm, is then run on the text to reduce the size of the text (for example, down to a few thousand sentences). The algorithm selects text segments (for example, sentences, paragraphs, words, etc.) that together have a desired linguistic coverage, that is the selected text includes the sounds that will be included in the desired voice corpus. As the above steps are typically performed using computing components, however, some errors may be included in the text segments that if recorded, would also introduce errors into the voice corpus. To avoid this, human proofreaders are typically involved.

The human proofreaders are typically native speakers of the voice corpus language. Currently, proofreaders are sent selected text segments in batches (perhaps hundreds or thousands of sentences at a time). The proofreaders then review the text segments to identify and correct any errors in the text segments. When a proofreader has completed his/her batch, he/she returns the corrected batch which is then incorporated into the system. Each time this occurs, rejected text segments may be removed from the group of selected text segments. This results in loss of linguistic coverage in the approved set, which must be corrected by adding additional selected text segments. For example, a particular rejected sentence may have included a certain word or diphone that was removed from the set when the sentence was rejected. The set cover algorithm may be re-run to identify a new sentence that has the particular word or diphone. However, that new sentence/text segment must then be sent to a proofreader for approval/rejection/correction. Each pass at this process may take days or weeks depending on the speed of each individual proofreader, the size of the set of selected text segments, the number of rejected text segments, etc. Further, if a proofreader returns corrections to particular text segments, incorporating those corrections can also be time consuming and result in undesired output as each proofreader may adjust text differently, and the corrections may alter the linguistic coverage of the original text segment.

Offered is a system to more efficiently identify and approve text for inclusion in a voice corpus. The system is provided that allows proofreaders to connect with a system, such as over network 702 to server 112, to provide feedback regarding text segments. The system may be configured to operate a web service or similar networked application so that multiple proofreaders may interface with the system concurrently, the system may receive feedback from multiple proofreaders concurrently, and the system may dynamically process approved text segments, rather than processing them in batches as they come in from proofreaders, as done previously. The system is described further below, using sentences as examples of text segments, though other text segments, such as paragraphs, words, etc. may also be used.

To allow for multiple proofreaders to interact with the system concurrently, in one aspect, the interface to the proofreaders allows each proofreader to review only a single sentence at a time. Once the proofreader is done with the assigned sentence, for example, by either approving it or rejecting it, the system may send the proofreader another sentence for review. Thus the system may receive feedback from the proofreader on an ongoing basis for each sentence reviewed. This also allows the system to recalibrate the approved sentences in significantly faster fashion than the batch process used previously. For example, the system may determine the linguistic coverage of the approved sentences (for example by running the set cover algorithm) after each sentence is approved and/or rejected, after feedback on a group of sentences is received, during certain time intervals, or on another schedule. Based on the current linguistic coverage of the approved sentences, the system may prioritize the available sentences, and send the top priority sentences out to proofreaders for feedback. This process may continue until the approved sentences meet one or more desired thresholds of linguistic coverage for the voice corpus.

Figure 3:
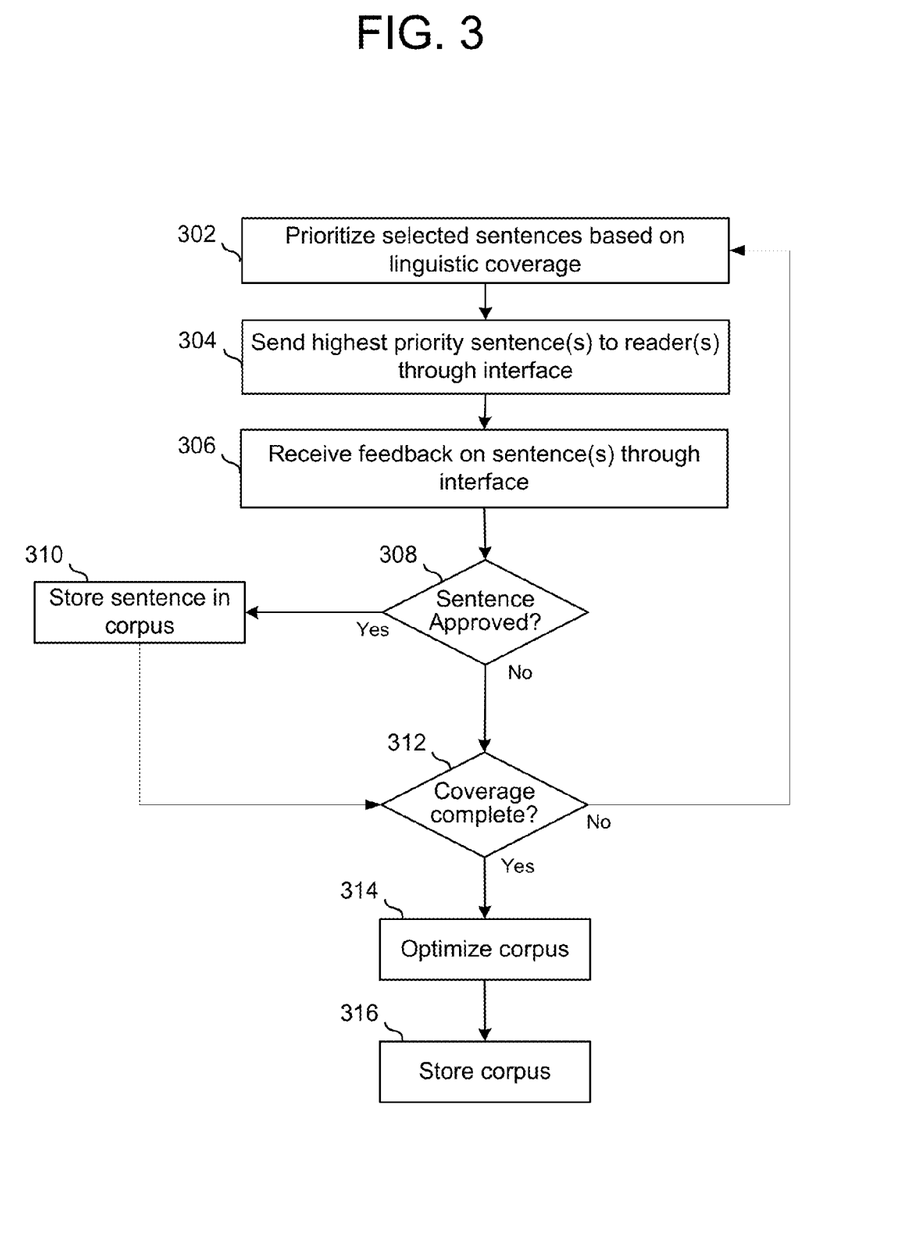
FIG. 3 illustrates a method for determining text for a voice corpus according to one aspect of the present disclosure.
Figure 4:
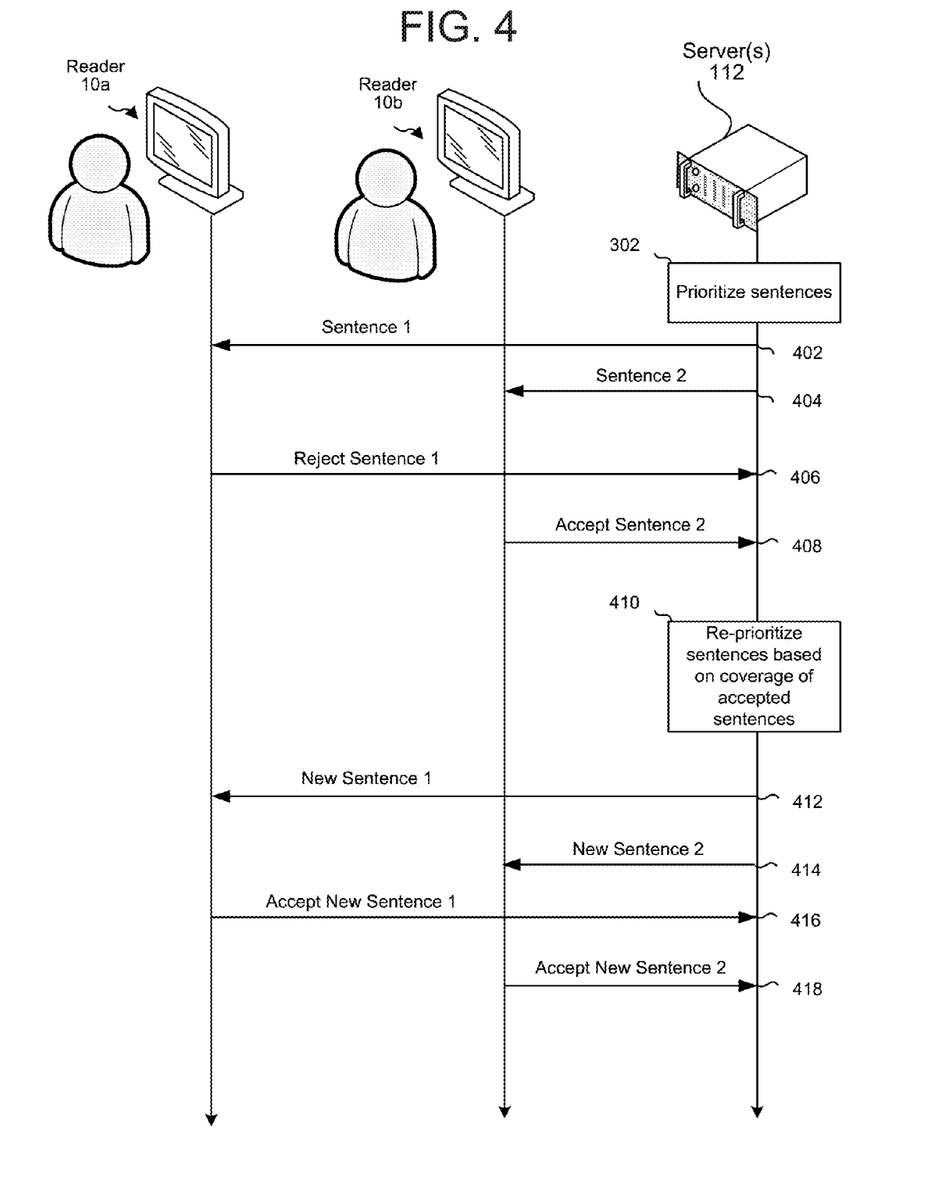
FIG. 4 illustrates a system for determining text for a voice corpus according to one aspect of the present disclosure.
Figure 5:
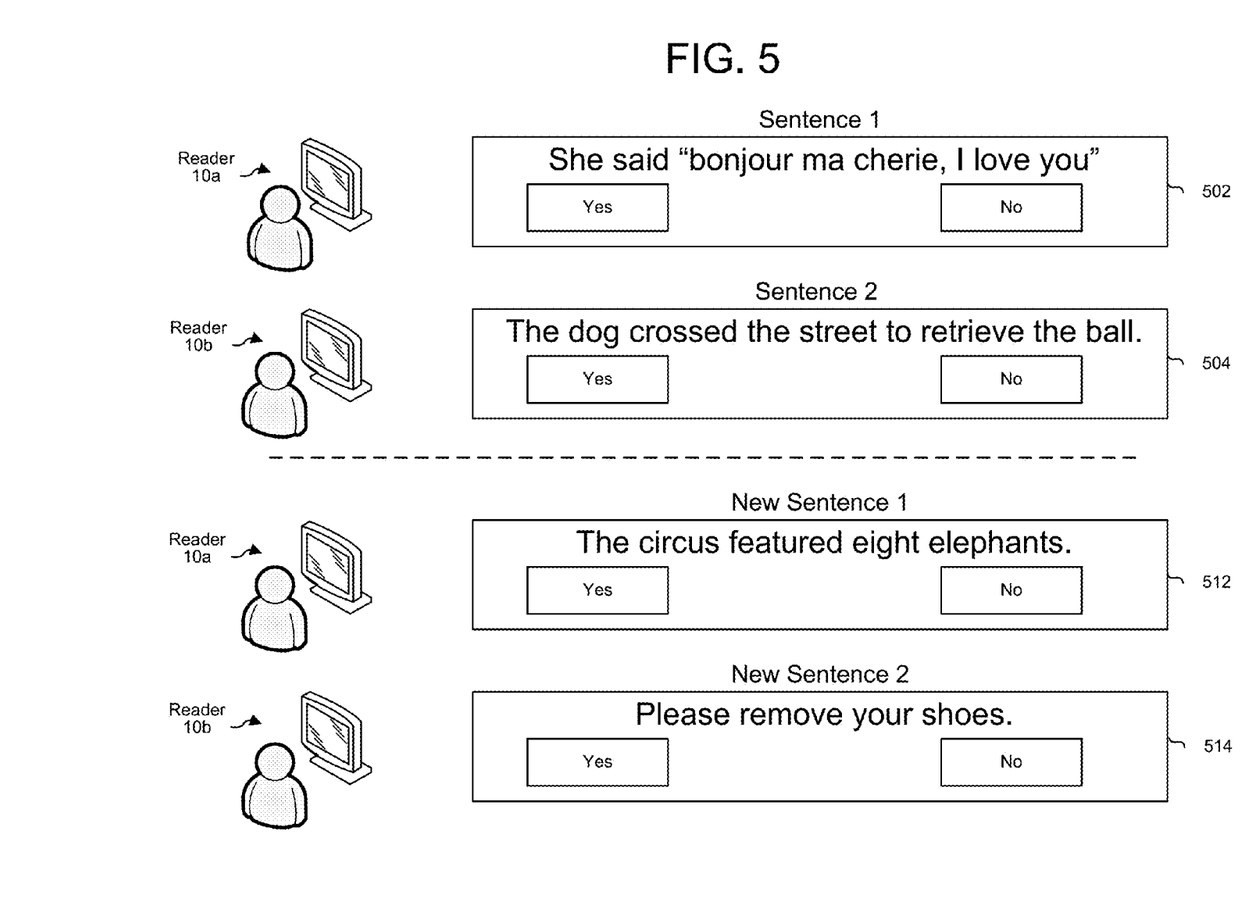
FIG. 5 illustrates a system for determining text for a voice corpus according to one aspect of the present disclosure.

This process is illustrated in FIGS. 3, 4, and 5. FIG. 3 illustrates the example process of creating a voice corpus using sentences as text segments, similar to that explained above in reference to FIG. 1, though with the universe of selected text already in place. Prior to sending a sentence to a proofreader for review, the system may prioritize (302) the selected sentences. The top priority sentences may be scheduled for review prior to the lower priority sentences. Sentences may be prioritized in a number of different ways, for example how many different prosodic units are included in each sentence, the linguistic coverage of the sentence, the length of the sentence, how easy the sentence is to pronounce (which may be represented by a readability score), the number of new units in the sentence not already in the corpus, and/or a number of other factors. The overall priority may be a combination of such factors, for example, a weighted average of the factors. The top priority sentence(s) may be sent (304) to a proofreader through the appropriate interface (e.g., web interface, application, dedicated connection, or other communication configuration). When considering the top priority sentence(s), the system may consider the already approved sentences and their aggregate linguistic coverage. For performance considerations, the system may select a group of the highest priority sentences (rather than one at a time) and send them to proofreaders. The group of next-highest priority sentences may be cached for quick delivery to the next available proofreader(s).

FIG. 4 illustrates sample communications between a server 112 of the system and proofreaders 10a and 10b. As shown, the server prioritizes sentences (302). The server 112 then sends the top priority sentence (Sentence 1) (402) to reader 10a and sends the second topmost priority sentence (Sentence 2) (404) to reader 10b. The readers would then see the respective sentences in the provided interface. Example interfaces are shown in FIG. 5. For example, reader 10a may be shown an interface including display portion 502 which shows Sentence 1: "She said 'bonjour ma cherie, I love you'." along with option boxes allowing reader 10a to accept or reject Sentence 1. Reader 10a may be shown an interface including display portion 504 which shows Sentence 2: "The dog crossed the street to retrieve the ball." along with option boxes allowing reader 10n to accept or reject Sentence 2. For purposes of illustration, reader 10a rejects Sentence 1 (for containing non-English words) while reader 10b accepts Sentence 2. As shown in FIG. 4, the indication of the rejection of Sentence 1 (406) is sent to the server 112 by the device of reader 10a and the indication of the acceptance of Sentence 2 (408) is sent to the server 112 by the device of reader 10b. The system then receives the feedback on the sentences through the interface, as shown in block 306 of FIG. 3.

For illustration of this example, the system will process the feedback for Sentence 1 and Sentence 2 at approximately the same time. For Sentence 2, the system will determine (308) that the sentence was approved and will store (310) Sentence 2 in the corpus. For Sentence 1, the system will determine (308) that Sentence 1 has been rejected and will discard Sentence 1. The system will then determine whether the aggregate accepted sentences (including Sentence 2 and any other sentences that were approved prior to this example) have a complete linguistic coverage as desired for the corpus. In the current illustration, the coverage is incomplete. The system will then re-prioritize (302) the selected sentences that have not yet been reviewed. This step is also shown in block 410 in FIG. 4. The system may re-prioritize (302) after each sentence is reviewed, after a certain number of sentences are reviewed, after a certain period of time, or at other configurable intervals. Two new priority sentences (New Sentence 1) 412 and New Sentence 2 (414) will then be sent, respectively, to reader 10a and reader 10b. As shown in FIG. 5, those sentences will then be presented through the interface to reader 10a (512) and reader 10b (514). As those sentences have no errors, an indication of acceptance of New Sentence 1 (416) and an indication of acceptance of New Sentence 2 (418) will be received by the server 112. New Sentence 1 and New Sentence 2 will then eventually be stored in the corpus. The process will continue with the next highest priority sentences until the accumulated accepted sentences achieve the desired threshold(s) of linguistic coverage for the corpus. When the desired coverage of the corpus is achieved (312: Yes), the system may optimize (314) the corpus, for example, by removing sentences from the corpus that include linguistic coverage provided by other sentences in the corpus. Once optimized, the corpus may be stored (316). Optimization may occur at other points as well, for example as new sentences are stored in the corpus (310), the system may optionally perform corpus optimization to ensure an efficient corpus with minimal overlap.

In one aspect, the present system presents proofreaders with a binary choice, to either accept or decline potential text segments without giving them the opportunity to edit the text segments. For example, as shown in FIG. 5. One benefit to this approach is that proofreaders may quickly process selected text segments as either accepted or rejected. Thus the system may quickly process many text segments without having to handle edits to the text segments. It further allows the system to receive feedback from proofreaders who may be skilled in the language of the voice corpus, but who may not necessarily be skilled in editing. The binary approve/reject approach also avoids dealing with idiosyncrasies of individual editing styles. One drawback to the binary approach, however, is that certain phonetically valuable text segments may be rejected, even if they contained only small errors that may be easily correctable (for example a word misspelled, punctuation confusion, etc.). To correct for this, back end operators (or modules) who are native speakers or have native language capability that can access the system may review and correct certain rejected text segments. Those corrected text segments may then be stored with the accepted text segments and incorporated into the voice corpus. When the set cover algorithm is then run, those corrected text segments will be considered when determining the linguistic coverage.

In another aspect, the present system may offer proofreaders the ability to accept or reject text segments and may also offer the ability to edit text segments or to otherwise indicate why a text segment is rejected. For example, a proofreader may mark words that are incorrect, from another language, have confusing pronunciations, etc. The system may then search remaining text segments for those words and remove those text segments from consideration. In another example, the proofreader may indicate that a text segment includes grammatical, typographical, or other errors (and potentially where those errors are in the text segment). The system may then send those text segments for correction, or even allow the proofreader to correct them. The corrected text segments may be stored with accepted text segments, or may be selected for further review by a different proofreader or other operator to ensure correctness of the proofreader's edits.

The system may send proofreaders normalized text, that is text where number characters, abbreviations, or other shorthand notations are spelled out in words. In one aspect the proofreader may be given not only the normalized text segment, but also a phonetic transcription of the text segment (and/or possibly the text segment prior to text normalization) so the proofreader may verify the text normalization and phonetic transcription provided by the system. Any corrections by the proofreader may be selected for further review by a different proofreader or other operator.

One benefit of the presented system, is that it offers the ability of multiple proofreaders to work concurrently on reviewing text segments for the same voice corpus while connected with the system across the interface, be it a web interface, software application, etc. This in turn allows the system to quickly receive feedback on multiple text segments and to re-prioritize other text segments for review based on an updated linguistic coverage of approved segments.

Further, because the present system continuously builds a library of accepted text segments until the voice corpus is completed, rather than doing so in batches, accepted text segments may be sent to a native speaker for recording even before the entirety of the text of the voice corpus is determined. Thus, as text segments are accepted, they may be sent to the native speaker for recording into audio that will be stored in the voice corpus. In another example, the native speaker recording the spoken audio may be connected to the system in a manner similar to a proofreader and may be presented with unapproved text segments, based on the determined priority of those text segments. The native speaker may review the text segment in a manner similar to a proofreader. If the native speaker determines the text segment is acceptable, the speaker may then record audio corresponding to the text segment. If the native speaker determines the text segment is unacceptable, the native speaker may reject the text segment, and the system may present a new text segment to the native speaker. That new text segment may be the next highest priority text segment. The system may re-prioritize available text segments after receiving the rejection from the native speaker, thus ensuring that the new text segment is the highest priority text segment even considering the loss of the linguistic coverage of the rejected text segment.

Although the process is illustrated above using human proofreaders, given sufficient computing resources it may be possible to review selected text segments using proofreading computing systems alone, without human proofreaders. In this aspect, the system may operate as described above, however the system may perform the review of text segments on its own, for example removing steps 304 and 306 of FIG. 3 and performing its own analysis of each sentence as part of decision block 308. Thus the system may receive an indication of a sentence approval or rejection from one or more computing modules designated for this task rather than from a human through the above described interface. Thus, in certain aspects, the proofreader may be a computing component (for example, hardware, software, firmware, etc. configured to review text segments) rather than a human.

Figure 6:
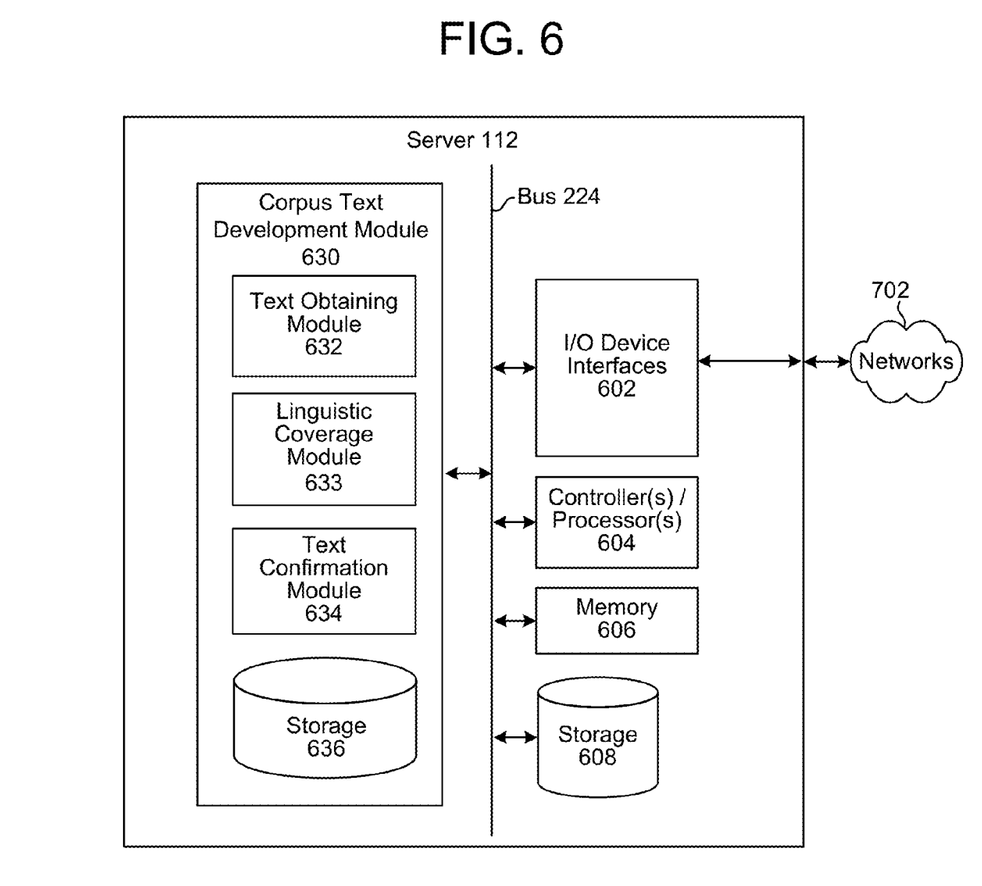
FIG. 6 is a block diagram conceptually illustrating a device for creating a voice corpus for text-to-speech processing according to one aspect of the present disclosure.

FIG. 6 is a block diagram conceptually illustrating example components of a server 112 for configuring a voice corpus for text-to-speech processing. In operation, the server 112 of system 100 may include computer-readable and computer-executable instructions that reside on the respective platform, as will be discussed further below.

The server 112 may connect to various input and output components via input/output (I/O) device interfaces 602. For example, the server 112 may include interfaces to connect to one or more networks 702 via the I/O device interfaces 602. This interfaces may support a physical connection, such as universal serial bus (USB), Ethernet, Thunderbolt or other connection protocol, and/or a wireless connection. Examples of wireless connections that the I/O device interfaces 602 may support include wireless local area network (WLAN) (such as WiFi) radio, Bluetooth, Long Term Evolution (LTE), WiMAX network, etc.

Through the network 702, the components and functionality of the system 100 may be distributed across a networked environment. As the system 100 in a distributed networked environment may include multiple servers or devices of varying hardware and software configurations, and utilize a network-accessible server 112 for varying degrees of processing, the components and functionality may sometimes be discussed in terms of system 100.

The server 112 may include an address/data bus 624 for conveying data among components of the server 112. Each component within the server 112 may also be directly connected to other components in addition to (or instead of) being connected to other components across the bus 624.

The server 112 may include one or more controllers/processors 604, a memory 606 and storage 608. The controllers/processors 604 may each include a central processing unit (CPU) for processing data and computer-readable instructions. The memory 606 may store data and instructions which are used by the controller/processors 604 at runtime. The memory 606 may include volatile random access memory (RAM), non-volatile read only memory (ROM), non-volatile magnetoresistive (MRAM) and/or other types of memory. The data storage component 608 may store data and controller/processor-executable instructions (e.g., instructions to develop a voice corpus). The data storage component 608 may include one or more non-volatile storage types such as magnetic storage, optical storage, solid-state storage, etc. The server 112 may also be connected to removable or external non-volatile memory and/or storage (such as a removable memory card, memory key drive, networked storage, etc.) through the input/output device interfaces 602.

The non-volatile portions of memory 606, data storage component 608, and external non-volatile memory/storage store computer-instructions in a non-transitory manner. Alternatively, or in addition to these components, some or all of the executable instructions may be embedded in hardware or firmware in addition to or instead of software.

The system functionality of adaptively developing text for a voice corpus may be provided by a corpus text development module 630. Components of the corpus text development module 630 may be distributed across the network environment across multiple servers 112 or other devices (such as machines operated by proofreaders 10) in a same system 100.

The text obtaining module 632 obtains text from various sources as described above. The text obtaining module 632 and/or the linguistic coverage module 633 may process the text to determine phonetic/linguistic representations of the text. The linguistic coverage module 633 may then determine a desired linguistic coverage for an eventual voice corpus and identify text segments within the obtained and processed text that, when combined, provide the desired linguistic coverage for the eventual voice corpus. The text confirmation module 634 may prioritize text segments for consideration and may coordinate with other components to send those text segments to entities (such as proofreaders or other components) for review. The text confirmation module 634 may receive indications of acceptance or rejection of certain text segments (and possibly indications of edits to text segments). Accepted text segments may be stored in storage 636. The linguistic coverage module 633 may determine a scope of linguistic coverage of accepted sentences (for example using a set cover algorithm). That determined linguistic scope may be sent to the text confirmation module 634 for consideration when prioritizing text segments for review. The linguistic coverage module 633 may also optimize the corpus, for example, pruning certain accepted text segments from the corpus as new text segments are approved to reduce overlapping linguistic coverage.

Figure 7:
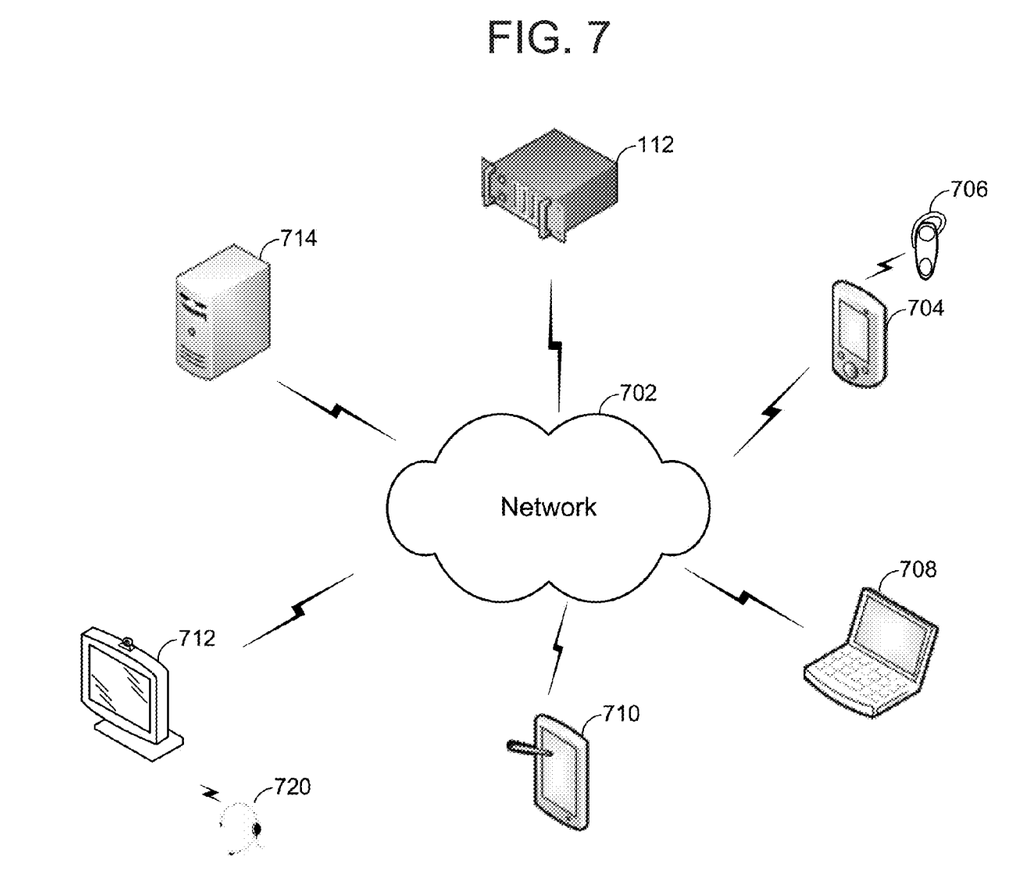
FIG. 7 illustrates a computer network for use with text-to-speech processing according to one aspect of the present disclosure.

As shown in FIG. 7 multiple devices may be connected over network 702. Network 702 may include a local or private network or may include a wide network such as the internet. Devices may be connected to the network 702 through either wired or wireless connections. For example, a wireless device 704 may be connected to the network 702 through a wireless service provider. Other devices, such as server 112, may connect to the network 702 through a wired connection. Other devices, such as laptop 708 or tablet computer 710 may be capable of connection to the network 702 using various connection methods including through a wireless service provider, over a WiFi connection, or the like. Networked devices may connect to allow proofreaders to provide feedback on voice corpus text segments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. For example, the TTS techniques described herein may be applied to many different languages, based on the language information stored in the TTS storage.

Aspects of the present disclosure may be implemented as a computer implemented method, a system, or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid state memory, flash drive, removable disk, and/or other media.

Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

What is claimed is:

1. A method comprising:
   receiving text data;
   determining text segments of the text data, the text segments including a first text segment and a second text segment;
   determining a first number of different phonetic units of the first text segment;
   determining a second number of different phonetic units of the second text segment;
   determining the first number is greater than the second number;
   sending, through a web-based interface based on the first number being greater than the second number, the first text segment to a first proofreader;
   receiving, through the web-based interface, an indication of approval of the first text segment from the first proofreader;
   adding the first text segment to a text-to-speech (TTS) corpus, the TTS corpus comprising approved text segments;
   determining a third number of different phonetic units of the TTS corpus comprising the first text segment;
   determining the third number is less than a desired number of different phonetic units of the TTS corpus; and
   sending, through the web-based interface based on the third number being less than the desired number, the second text segment to a second proofreader.

2. The method of claim 1, wherein the first text segment and the second text segment are selected based at least in part on the first number and the second number.

3. A method, comprising:
   receiving text data;
   determining a first text segment of the text data, the first text segment including a first number of different phonetic units;
   determining a second text segment of the text data, the second text segment including a second number of different phonetic units;
   determining the first number is greater than the second number;
   sending, based on the first number being greater than the second number, the first text segment to a first proofreader through a communications interface;
   receiving feedback on the first text segment through the communications interface;
   adding, based on the feedback, the first text segment to a text-to-speech (TTS) corpus, the TTS corpus comprising approved text segments;
   determining a third number of different phonetic units of the TTS corpus comprising the first text segment;
   determining the third number is less than a desired number of different phonetic units of the TTS corpus; and
   sending, based on the third number being less than the desired number, the second text segment to a second proofreader through the communications interface.

4. The method of claim 3, wherein the communications interface is a web-based interface.

5. The method of claim 3, wherein receiving the feedback comprises receiving audio data including an utterance corresponding to the first text segment from the first proofreader.

6. The method of claim 3, further comprising:
   sending a third text segment to a third proofreader through the communications interface; and
   determining a fourth number of different phonetic units of the TTS corpus comprising the first text segment and the third text segment.

7. The method of claim 3, wherein the feedback comprises a correction to the first text segment.

8. The method of claim 3, further comprising:
   receiving second feedback on the second text segment through the communications interface;
   adding, based on the second feedback, the second text segment to the TTS corpus;
   determining a fourth number of different phonetic units of the TTS corpus comprising the first text segment and the second text segment; and
   determining the fourth number meets the desired number.

9. A computing system, comprising:
   at least one processor;
   memory including instructions that, when executed cause the at least one processor to:
      receive text data;
      determine a first text segment of the text data, the first text segment including a first number of different phonetic units;
      determine a second text segment of the text data, the second text segment including a second number of different phonetic units;
      determine the first number is greater than the second number;

send, based on the first number being greater than the second number, the first text segment to a first proofreader through a communications interface;

receive feedback on the first text segment through the communications interface;

add, based on the feedback, the first text segment to a text-to-speech (TTS) corpus, the TTS corpus comprising approved text segments;

determine a third number of different phonetic units of the TTS corpus comprising the first text segment;

determine the third number is less than a desired number of different phonetic units of the TTS corpus; and send, based on the third number being less than the desired number, the second text segment to a second proofreader through the communications interface.

10. The computing system of claim 9, wherein the communications interface is a web-based interface.

11. The computing system of claim 9, wherein the instructions causing the at least one processor to receive the feedback further cause at least one processor to receive audio data including an utterance corresponding to the first text segment from the first proofreader.

12. The computing system of claim 9, wherein the instructions further cause the at least one processor to:

send a third text segment to a third proofreader through the communications interface; and determine a fourth number of different phonetic units of the TTS corpus comprising the first text segment and the third text segment.

13. The computing system of claim 9, wherein the feedback comprises a correction to the first text segment.

14. The computing system of claim 9, wherein the instructions further cause the at least one processor to:

receive second feedback on the second text segment through the communications interface;

add, based on the second feedback, the second text segment to the TTS corpus;

determine a fourth number of different phonetic units of the TTS corpus comprising the first text segment and the second text segment; and determine the fourth number meets the desired number.

* * * * *